April 24, 1928.

O. COX ET AL 1,667,588

WRIST PIN

Filed July 18, 1927

Oscar Cox
Orvis C. Willis, INVENTORS

BY Victor J. Evans

ATTORNEY

Patented Apr. 24, 1928.

1,667,588

UNITED STATES PATENT OFFICE.

OSCAR COX AND ORVIS CARRY WILLIS, OF COTTON VALLEY, LOUISIANA.

WRIST PIN.

Application filed July 18, 1927. Serial No. 206,639.

REISSUED

This invention relates to a wrist pin which is mainly designed for use with the crank of an oil well rig, and which is an improvement over that forming the subject matter of an application filed October 2, 1926, Serial No. 139,218, allowed February 17, 1927.

The general object of this invention is to strengthen the device and make it more practical and more efficient.

This invention also consists in certain other features of construction and in the combination and arrangement of the several parts, to be hereinafter fully described, illustrated in the accompanying drawings and specifically pointed out in the appended claims.

In describing our invention in detail, reference will be had to the accompanying drawings wherein like characters denote like or corresponding parts throughout the several views, and in which:—

Figure 1:
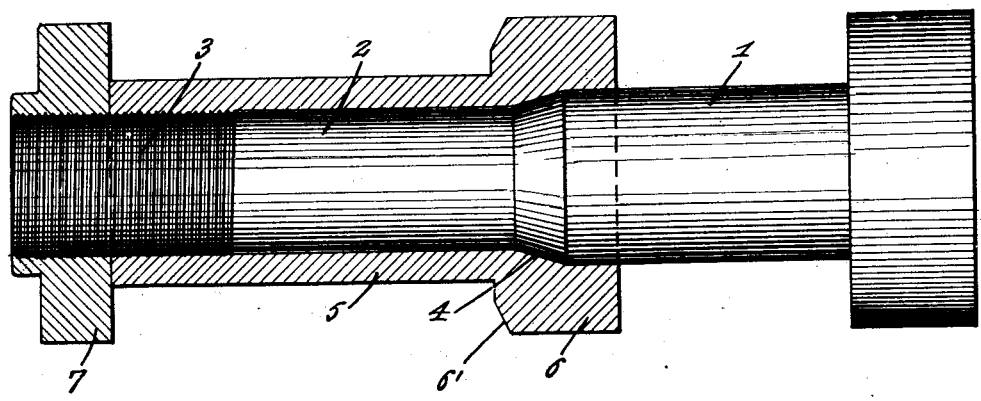
Figure 1 is a view of the improved wrist pin, with parts in elevation and parts in section.
Figure 2:
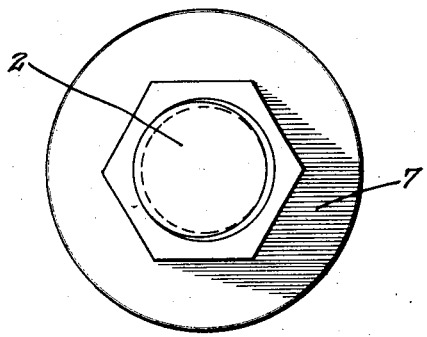
Figure 2 is an end view thereof.

In these views 1 indicates the pin which is formed with a reduced part 2 having threads 3 at its outer end, a tapered shoulder 4 being formed at the junction of the major part of the pin with the reduced part thereof. A sleeve 5 fits over the reduced part of the pin and has its head 6 formed with an opening. The outer part is cylindrical to receive the end of the major portion of the pin and the inner part is beveled to receive the shoulder 4 of the pin. A nut 7 engages the threaded part of the reduced portion 2 and holds the sleeve in place, with the beveled wall of the head against the shoulder. The crank of the rig fits between the head of the pin and the head 6 of the sleeve.

The head 6 is provided with the beveled corner 6' to prevent this part from cutting the pitman bearing.

From the foregoing it will be seen that this device is of much greater strength than the device forming the subject matter of the above mentioned application and has greater efficiency. The sleeve strengthens the reduced part of the pin and the beveled shoulder also adds strength to the pin.

It is thought from the foregoing description that the advantages and novel features of our invention will be readily apparent.

We desire it to be understood that we may make changes in the construction and in the combination and arrangement of the several parts, provided that such changes fall within the scope of the appended claims.

What we claim is:—

1. A wrist pin of the class described comprising a pin having a reduced part threaded at its outer end, a beveled shoulder connecting the reduced part to the other part, a sleeve fitting over the reduced part and having a beveled wall engaging the shoulder and a nut threaded on the pin for holding the sleeve against the shoulder.

2. A wrist pin of the class described comprising a pin having a reduced part threaded at its outer end, a beveled shoulder connecting the reduced part to the other part, a sleeve fitting over the reduced part and having a beveled wall engaging the shoulder and a nut threaded on the pin for holding the sleeve against the shoulder, said sleeve having a head, the outer corner of which is beveled.

In testimony whereof we affix our signatures.

OSCAR COX.
ORVIS CARRY WILLIS.